United States Patent
Profumo et al.

(10) Patent No.: US 10,708,073 B2
(45) Date of Patent: Jul. 7, 2020

(54) CONFIGURATION BASED CRYPTOGRAPHIC KEY GENERATION

(71) Applicant: Honeywell International Inc., Morris Plains, NJ (US)

(72) Inventors: John D. Profumo, St. Petersburg, FL (US); Thomas Cordella, Tampa, FL (US); James L. Tucker, Clearwater, FL (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 15/346,487

(22) Filed: Nov. 8, 2016

(65) Prior Publication Data

US 2018/0131528 A1    May 10, 2018

(51) Int. Cl.
*H04L 9/32* (2006.01)
*H04L 9/06* (2006.01)
*H04L 9/08* (2006.01)

(52) U.S. Cl.
CPC .......... *H04L 9/3278* (2013.01); *H04L 9/0618* (2013.01); *H04L 9/0643* (2013.01); *H04L 9/0861* (2013.01); *H04L 9/3247* (2013.01)

(58) Field of Classification Search
CPC ... H04L 9/3278; H04L 9/3247; H04L 9/0618; H04L 9/0643; H04L 9/0861
See application file for complete search history.

(56) References Cited

U.S. PATENT DOCUMENTS

| | | |
|---|---|---|
| 5,058,164 A | 10/1991 | Elmer et al. |
| 5,987,572 A | 11/1999 | Weidner et al. |
| 6,075,858 A | 6/2000 | Schwartzman |
| 6,304,658 B1 | 10/2001 | Kocher et al. |
| 6,907,595 B2 | 6/2005 | Curd et al. |
| 7,054,446 B2 | 5/2006 | Ishihara et al. |
| 7,117,372 B1 | 10/2006 | Trimberger et al. |
| 7,120,696 B1 | 10/2006 | Au et al. |
| 7,185,205 B2 | 2/2007 | Launchbury et al. |
| 7,305,084 B2 | 12/2007 | Hawkes et al. |
| 7,328,384 B1 * | 2/2008 | Kulkarni ........ G01R 31/318519 714/725 |

(Continued)

FOREIGN PATENT DOCUMENTS

| CN | 104346584 A | 2/2015 |
|---|---|---|
| DE | 102015206643 A1 | 10/2016 |

OTHER PUBLICATIONS

Singh, "A Taste of Computer Security," downloaded on Sep. 14, 2011, from http://www.kernelthread.com/publications/security/smemory.html, 6 pp.

(Continued)

*Primary Examiner* — Khoi V Le (74) *Attorney, Agent, or Firm* — Shumaker & Sieffert, P.A.

(57) ABSTRACT

In some examples, a programmable device may load configuration data into a configuration storage to configure programmable logic of the programmable device. The programmable device may include a key generation logic that may read at least a portion of the configuration data from the configuration storage. The key generation logic may generate a cryptographic key based at least in part on the at least a portion of the configuration data read from the configuration storage.

17 Claims, 6 Drawing Sheets

(56) References Cited

U.S. PATENT DOCUMENTS

| | | |
|---|---|---|
| 7,451,288 B2 | 11/2008 | Goetffert et al. |
| 7,519,830 B2 | 4/2009 | Mihm, Jr. et al. |
| 7,631,195 B1 | 12/2009 | Yu et al. |
| 7,673,201 B1 | 3/2010 | Chan et al. |
| 7,685,434 B2 | 3/2010 | Kaniz et al. |
| 7,853,803 B2 | 12/2010 | Milliken |
| 7,912,223 B2 | 3/2011 | Osaki |
| 7,979,716 B2 | 7/2011 | Fiske |
| 8,001,374 B2 | 8/2011 | Wise |
| 8,151,333 B2 | 4/2012 | Zhu et al. |
| 8,214,654 B1 | 7/2012 | Wyatt |
| 8,332,634 B2 | 12/2012 | Derouet |
| 8,375,225 B1 | 2/2013 | Ybarra |
| 8,379,841 B2 | 2/2013 | Taylor et al. |
| 8,386,800 B2 | 2/2013 | Kocher et al. |
| 8,589,695 B2 | 11/2013 | Parkinson et al. |
| 8,594,326 B2 | 11/2013 | Kerins et al. |
| 9,128,876 B2 | 9/2015 | Cordella et al. |
| 9,720,700 B1 * | 8/2017 | Brown .................... G06F 21/31 |
| 2001/0021254 A1 | 9/2001 | Furuya et al. |
| 2002/0073326 A1 | 6/2002 | Fontijn |
| 2002/0112161 A1 | 8/2002 | Fred, III et al. |
| 2002/0131592 A1 | 9/2002 | Hinnant |
| 2002/0169972 A1 | 11/2002 | Tanaka et al. |
| 2003/0014639 A1 | 1/2003 | Jackson et al. |
| 2003/0037248 A1 | 2/2003 | Launchbury et al. |
| 2003/0070083 A1 | 4/2003 | Nessler |
| 2004/0019782 A1 | 1/2004 | Hawkes et al. |
| 2004/0078570 A1 | 4/2004 | Geiringer et al. |
| 2004/0078576 A1 | 4/2004 | Geitinger |
| 2004/0103269 A1 | 5/2004 | Stark |
| 2004/0117778 A1 | 6/2004 | Sehr et al. |
| 2005/0177716 A1 | 8/2005 | Ginter et al. |
| 2005/0232415 A1 | 10/2005 | Little et al. |
| 2005/0251866 A1 | 11/2005 | Kobayashi et al. |
| 2006/0177065 A1 | 8/2006 | Halbert |
| 2006/0259780 A1 | 11/2006 | Benardeau |
| 2007/0073326 A1 | 3/2007 | Fontijn |
| 2007/0192592 A1 | 8/2007 | Goetffert et al. |
| 2008/0059795 A1 | 3/2008 | Vogel |
| 2008/0183656 A1 | 7/2008 | Perng et al. |
| 2008/0260159 A1 | 10/2008 | Osaki |
| 2010/0054475 A1 | 3/2010 | Schneider |
| 2010/0095134 A1 | 4/2010 | Srinivasan et al. |
| 2010/0115286 A1 | 5/2010 | Hawkes et al. |
| 2010/0183146 A1 | 7/2010 | Leech |
| 2010/0250967 A1 * | 9/2010 | Miwa ..................... G09C 1/00 713/190 |
| 2011/0219173 A1 | 9/2011 | Morita |
| 2011/0276808 A1 | 11/2011 | Yuki |
| 2011/0314304 A1 | 12/2011 | Braams |
| 2012/0159184 A1 | 6/2012 | Johnson et al. |
| 2013/0013934 A1 | 1/2013 | King et al. |
| 2013/0080790 A1 | 3/2013 | Pean et al. |
| 2013/0145177 A1 | 6/2013 | Cordella et al. |
| 2013/0236019 A1 | 9/2013 | Zaverucha et al. |
| 2014/0006797 A1 | 1/2014 | Cordella et al. |
| 2014/0037093 A1 | 2/2014 | Park et al. |
| 2014/0310527 A1 | 10/2014 | Veugen et al. |
| 2015/0171870 A1 * | 6/2015 | Parker .............. H03K 19/17768 380/44 |
| 2015/0195089 A1 | 7/2015 | Yajima |
| 2016/0306750 A1 | 10/2016 | Tucker et al. |
| 2018/0123789 A1 | 5/2018 | Merli |

OTHER PUBLICATIONS

Wheeler, "A Bulk Data Encryption Algorithm," downloaded on Sep. 14, 2011, from http://www.cix.co.uk/~klockstone/wake.htm, 9 pp.

DS5002FP Secure Microprocessor Chip, downloaded on Sep. 14, 2011, from http://pdfserv.maxim-ic.com/en/ds/DS5002-DS5002FP, 25 pp.

Huo et al., "PEM: A Lightweight Program Memory Encryption Mechanism for Embedded Processor", ScienceDirect, Journal of China Universities of Posts and Telecommunications, Feb. 2010, 17(1): 77-84.

Nagaraj et al., "Joint Entropy Coding and Encryption using Robust Chaos," School of Natural and Engineering Sciences, National Institute of Advanced Studies, Aug. 14, 2006, 24 pp.

Shi et al., "Memory-centric Security Architecture," HiPEAC 2005; Nov. 2005; Springer; 16 pp.

Trimberger, et al., "Authenticated Encryption for FPGA Bitstreams," FPGA '11; Feb. 27-Mar. 1, 2011, pp. 83-86.

Tapp, "Configuration Readback Capture in UltraScale FPGAs," XILINX; www.xilinix.com; Nov. 20, 2015, 24 pp.

Eastlake, et al., "Randomness Recommendations for Security," Dec. 1994, RFC 1750, 30 pp.

Nixon, et al., "True Random Number Generation for Cryptography, on the Cheap," 2013, 6 pp. (Applicant points out, in accordance with MPEP 609.04(a), that the year of publication, 2013, is sufficiently earlier than the effective U.S. filing date, Nov. 8, 2016, such that the particular month of publication is not in issue.).

Hong et al., "Dynamic Encryption Key Design and Management for Memory Data Encryption in Embedded Systems," 2013 IEEE Computer Society Annual Symposium on VLSI, Aug. 5-7, 2013; pp. 70-75.

Khaing et al., "A Study of Key Management Systems in Storage Area Network," IJCSNS International Journal of Computer Science and Network Security, vol. 9, No. 7, Jul. 2009, pp. 269-275.

European Search Report from counterpart European Application No. 17199285.2, dated Mar. 7, 2018, 7 pp.

Examination Report from counterpart European Application No. 17199285.2, dated Oct. 10, 2018, 5 pp.

Response to Extended Search Report dated Mar. 7, 2018, from counterpart European Patent Application No. 17199285.2, filed on Jun. 26, 2018, 9 pp.

Response to the Examination Report dated Oct. 10, 2018, from counterpart European Application No. 17199285.2, filed Jan. 17, 2019, 8 pp.

Examination Report from counterpart European Application No. 17199285.2, dated May 9, 2019, 5 pp.

Response to Examination Report dated May 9, 2019, from counterpart European Application No. 17199285.2, filed Sep. 6, 2019, 8 pp.

Examination Report from counterpart European Application No. 17199285.2, dated Dec. 16, 2019, 5 pp.

Response to Examination Report dated Dec. 16, 2019, from counterpart European Application No. 17199285.2, filed Mar. 18, 2020, 9 pages.

* cited by examiner

CONFIGURATION BASED CRYPTOGRAPHIC KEY GENERATION

TECHNICAL FIELD

This disclosure relates to cryptographic key generation for programmable logic devices.

BACKGROUND

A programmable logic device is an electrical circuit having hardware logic elements, also known as programmable logic, that may be configured by loading application-specific configuration data into configuration storage in the programmable logic device. The configuration data may configure the logic elements so that they perform functionality defined by the configuration data. The configuration data for a programmable logic device may carry critical information that is encrypted to protect the critical information from unauthorized access. The configuration data may configure the programmable logic of the programmable logic device to decrypt the encrypted critical information, so that the critical information may be further processed.

SUMMARY

In some aspects, the disclosure describes example devices, systems, and techniques for generating a cryptographic key on a programmable logic device to decrypt cipher text into plaintext. The programmable logic of the programmable logic device may be configured by configuration data to include key generation logic that takes the same configuration data as input and generates the cryptographic key based at least in part on the input configuration data. In this way, attempts to reconfigure the programmable logic to read the cryptographic key generated by the key generation logic would lead to the key generation logic generating a cryptographic key that cannot be used to decrypt the cipher text, thereby improving the security of the programmable logic device.

In one example, the disclosure is directed to a system comprising: configuration storage configured to store configuration data; programmable logic operably coupled to the configuration storage and configured by the configuration data; and a key generation logic configured to read at least a portion of the configuration data from the configuration storage and to generate a cryptographic key based at least in part on the at least a portion of the configuration data read from the configuration storage.

In another example, the disclosure is directed to a method comprising: loading, by a programmable device, configuration data into a configuration storage to configure programmable logic of the programmable device; reading, by the key generation logic, at least a portion of the configuration data from the configuration storage; and generating, by the key generation logic, a cryptographic key based at least in part on the at least a portion of the configuration data read from the configuration storage.

In another example, the disclosure is directed to a computer-readable storage medium comprising instructions that upon execution cause a processor to: load configuration data into configuration storage of a programmable device to configure programmable logic of the programmable device; read, by a key generation logic, at least a portion of the configuration data from the configuration storage; and generate, by the key generation logic, a cryptographic key based at least in part on the at least a portion of the configuration data read from the configuration storage.

The details of one or more examples are set forth in the accompanying drawings and the description below. Other features, objects, and advantages in addition to those described below will be apparent from the description and drawings, and from the claims.

DETAILED DESCRIPTION

Example devices, systems, and techniques for a programmable logic device to generate a cryptographic key are described in this disclosure. A programmable logic device may include programmable logic that may be configured by configuration data to include key generation logic that generates a cryptographic key that may be used to decrypt encrypted information. For example, the key generation logic may generate the cryptographic key based on one or more inputs of the key generation logic. However, generating the cryptographic key in this way may enable a malicious attacker to access the cryptographic key. For example, a malicious attacker may reconfigure the programmable logic by loading reconfiguration data into the programmable logic device to insert debug logic into the programmable logic that can read the output of key generation logic, thereby enabling access to the cryptographic key generated by key generation logic.

In accordance with aspects of the present disclosure, the programmable logic of a programmable logic device may be configured by configuration data to include key generation logic that reads the configuration data for the programmable logic and generates a cryptographic key based at least in part on the configuration data. Because the generation of the cryptographic key is dependent upon the configuration data that configures the programmable logic, then reconfiguring the programmable logic may result in key generation logic generating a different, invalid cryptographic key that cannot be used to decrypt the encrypted information.

Specifically, if an attacker attempts to reconfigure the programmable logic by loading reconfiguration data into the programmable logic device to insert debug logic into the programmable logic that can read the output of key generation logic, the loading of the reconfiguration data in effect modifies the configuration data that configures the programmable logic. Thus, when the key generation logic reads the configuration data for the programmable logic, the key generation logic is reading configuration data that has been modified by the reconfiguration data. Because the key generation logic generates the cryptographic key based at least in part on the configuration data, modifying the configuration data for the programmable logic results in the key generation logic generating a different, invalid cryptographic key.

Figure 1:
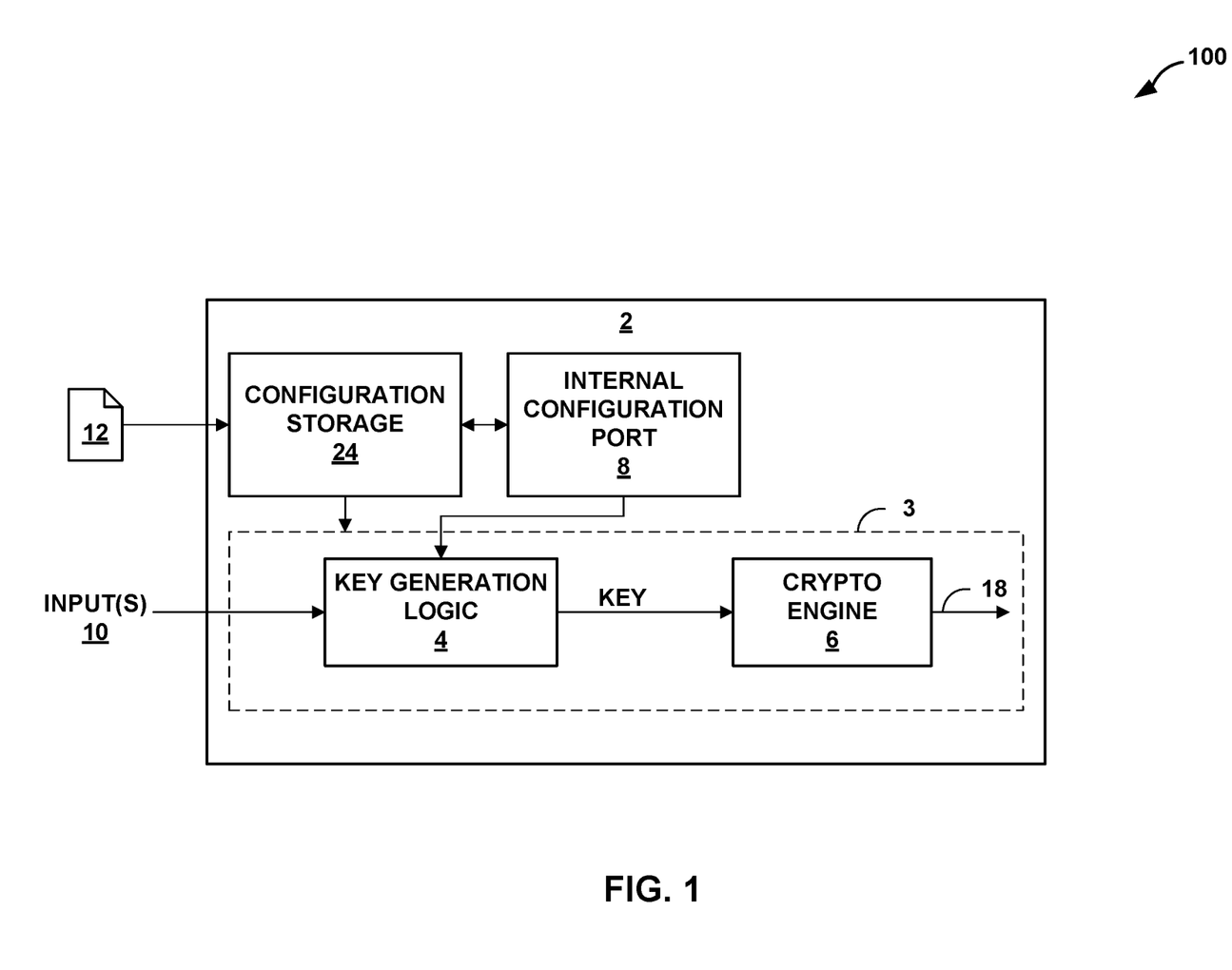
FIG. 1 is a functional block diagram illustrating an example system that includes an example programmable logic device that is configured to include key generation logic to generate a cryptographic key.

FIG. 1 is a functional block diagram illustrating an example system that includes an example programmable logic device that is configured to include key generation logic to generate a cryptographic key. As shown in FIG. 1, system 100 may be a computing device or system, or components thereof, that includes programmable logic device 2. Programmable logic device 2 may be an electrical circuit, an integrated circuit, microchip, semiconductor device, reconfigurable digital circuit, or any other suitable interconnection of electrical components containing hardware elements that may be programmed to perform a variety of logical functions.

Programmable logic device 2 may include programmable logic 3. Programmable logic 3 may include a set of logic elements and blocks such as switches, interconnects, memories, processors, dedicated analog function blocks, latches, flip flops, digital circuitry, and the like, which may form configurable blocks of logic and configurable interconnects between these blocks of logic. Programmable logic 3 may be configured by loading configuration data 12 into configuration storage 24 that is operably coupled to the logic elements and to connect these blocks of logic in such a way in order to perform functionality from simple logical functions to complex digital and/or analog computations. In some examples, programmable logic 3 may be reprogrammable, such as by loading updated configuration data into the memory cells, so that programmable logic 3 may be configured multiple times to perform different functionality.

Configuration data 12 may be a collection of computer instructions that specifies the functionality to be performed by programmable logic 3 that is compiled into a bitstream. For example, configuration data 12 may describe the structure and the behavior of programmable logic 3, such as describing the connectivity, function, state, and the like, of every logic element of programmable logic 3, in order for the logic elements of programmable logic 3 to perform the specified functionality. Thus, not only may configuration data 12 describe the structure and behavior of the logic elements making up key generation logic 4 and cryptographic engine 6, configuration data 12 may also describe the structure and behavior of the idle logic elements within programmable logic 3, such as the logic elements of programmable logic 3 not included as part of key generation logic 4 and cryptographic engine 6. Thus, reconfiguring currently idle elements of programmable logic 3 (i.e., elements that do not make up key generation logic 4 and cryptographic engine 6) to perform some functionality may require modifying configuration data 12. In this way, configuration data 12 may include configuration information about each logic element within programmable logic 3, with the possible exception of logic elements that include cipher text that is to be decrypted by cryptographic engine 6.

Configuration data 12 may be code written in a hardware description language such as VHSIC Hardware Description Language (VHDL), Verilog, C, C++, netlists, and the like that is compiled into binary form and loaded onto programmable logic device 2 as a bitstream. In some examples, configuration data 12 may be encrypted and loaded onto programmable logic device 2, which may decrypt the encrypted configuration data 12 using a cryptographic key embedded within programmable logic device 2.

System 100 may load configuration data 12 onto configuration storage 24 to configure programmable logic 3 according to the structure and behavior described by configuration data 12. System 100 may load configuration data 12 from memory (e.g., system memory, on-chip memory in an integrated circuit that includes programmable logic device 2, memory external to the integrated circuit that includes programmable logic device 2, and the like), a storage device, over a network, and the like onto configuration storage 24. Configuration storage 24 may be memory operably coupled to the logic elements of programmable logic 3 that configures the behavior and connectivity of the logic elements of programmable logic 3 according to configuration data 12. For example, configuration storage 24 may be memory cells that are operably coupled to each logic element of programmable logic 3, and each memory cell operably coupled to a respective logic element may include instructions for configuring the respective logic element, including configuring the behavior and functioning of the logic element as well as configuring how the respective logic element is connected to other logic elements within programmable logic 3. In this way, system 100 configures the logic elements of programmable logic 3 to perform the functionality specified by configuration data 12.

In some examples, configuration storage 24 may comprise non-volatile memory, such as flash memory, so that configuration storage 24 may retain configuration data 12 loaded onto configuration storage 24 across power cycles of programmable logic device 2. In other examples, configuration storage 24 may comprise volatile memory, such as static random access memory (SRAM), so that system 100 may need to load configuration data 12 into configuration storage 24 after each power cycle because configuration storage 24 may not retain configuration data 12 across power cycles.

Once configuration data 12 is loaded into configuration storage 24, configuration storage may be accessible via internal configuration port 8 of programmable logic device 2 so that reconfiguration data may be loaded into configuration storage 24 via internal configuration port 8 to reconfigure programmable logic 3. Internal configuration port 8 may be a hardware interface, such as ports, buses, and the like in programmable logic device 2 that enables access to configuration storage 24, so that internal configuration port 8 may be used by elements within system 100 to read configuration data (e.g., configuration data 12) from configuration storage 24 as well to write reconfiguration data to configuration storage 24 to reconfigure programmable logic 3.

In the example of FIG. 1, programmable logic 3 may be configured according to configuration data 12 to include key generation logic 4 and cryptographic engine 6. Key generation logic 4 and cryptographic engine 6 may each be a set of logic elements and interconnects configured to perform the functions described herein. Key generation logic 4 may be configured to generate a cryptographic key that cryptographic engine 6 may utilize to perform cryptographic operations. For example, cryptographic engine 6 may utilize the cryptographic key generated by key generation logic 4 to encrypt plaintext into cipher text, decrypt cipher text into plaintext, digitally sign a piece of data, authenticate a digitally signed piece of data, and the like. When the cryptographic key is used to decrypt cipher text, the cryptographic key may also be referred to as a decryption key. Conversely, when the cryptographic key is used to encrypt plaintext, the cryptographic key may be referred to as an encryption key.

Key generation logic 4 may be configured to read configuration data 12 from configuration storage 24 and to generate the cryptographic key based at least in part on configuration data 12 read from configuration storage 24. In other words, key generation logic 4 may receive as input the same configuration data 12 that configured programmable logic 3 to include key generation logic 4, and may generate the cryptographic key based on the configuration data 12 that key generation logic 4 receives as input.

In some examples, key generation logic 4 may generate the cryptographic key based at least in part on the entirety of configuration data 12. In other words, key generation logic 4 may generate the cryptographic key based at least in part on how every logic element within programmable logic 3 is configured by configuration data 12. Thus, any reconfiguration of programmable logic 3 may cause key generation logic 4 to generate a different cryptographic key.

In other examples, key generation logic 4 may generate the cryptographic key based at least in part on at least a portion of configuration data 12. In other words, key generation logic 4 may generate the cryptographic key based on less than the entirety of configuration data 12.

System 100 may determine which portions of configuration data 12 that key generation logic 4 uses generate the cryptographic key, and which portions of configuration data 12 that key generation logic 4 does not use when generating the cryptographic key. For example, if configuration data 12 includes cipher text that is to be decrypted by cryptographic engine 6, then key generation logic 4 may generate the cryptographic key based at least in part on portions of configuration data 12 other than the portions of configuration data 12 that includes the cipher text. Because key generation logic 4 generates cryptographic key that is usable to decrypt cipher text, key generation logic 4 may not use cipher text to generate a cryptographic key that is used to decrypt itself.

In some examples, system 100 may select the portions of configuration data 12 that key generation logic 4 may use to generate a cryptographic key based at least in part on a determination of whether the contents of the portions of configuration data 12 are predictable or unpredictable. For example, some design elements within configuration data 12 may change when those elements of configuration data 12 is loaded into configuration storage 24. Thus, data within those portions of configuration data 12, when read back form configuration storage 24 via internal configuration port 8, may differ from data within those portions of configuration data 12 prior to being loaded into configuration storage 24. Otherwise, the inclusion of inconsistent data may result in generating an invalid cryptographic key that is unable to decrypt a particular cipher text.

Thus, in one example, key generation logic 4 may generate a cryptographic key based at least in part on a portion (but not the entirety) of configuration data 12 by utilizing portions of configuration data 12 that include static elements (i.e., data that does not change when loaded into configuration storage 24), and not utilizing portions of configuration data that include design elements that may change when those elements of configuration data 12 is loaded into configuration storage 24.

In some examples, for time sensitive applications, key generation logic 4 may utilize only a portion (i.e., a subset), rather than all, of configuration data 12 in order to reduce computation cycles in reading and processing configuration data 12. Key generation logic 4 may also generate a cryptographic key in multiple cycles. For example, in a first cycle, key generation logic 4 may generate an intermediate key based on a first portion (i.e. a first subset) of configuration data 12. Subsequently, in a second cycle, key generation logic 4 may generate the cryptographic key based on a second portion (i.e., a second subset) of configuration data 12 and the intermediate key. The first portion of configuration data 12 may be different from the second portion of configuration data 12. For example, the first and second portions of configuration data 12 may not overlap, or the first and second portions of configuration data 12 may partially but not fully overlap.

In some examples, indications of the portions of configuration data 12 that are used by key generation logic 4 may be stored in a lookup table in memory (e.g., memory in system 100 or memory in programmable logic device 2). For example, such a lookup table may include memory addresses within configuration storage 24 of locations that store the specific regions of configuration data 12 used to generate the cryptographic key. Such a lookup table may be encrypted using the cryptographic key, so that locations within configuration storage 24 that store the specific regions of configuration data 12 used to generate the cryptographic key cannot be readily identified without the cryptographic key. In some examples, instead of storing indications of the portions of configuration data 12 that are used by key generation logic 4, the lookup table may instead store indications of the portions of configuration data 12 that are not used by key generation logic 4 to generate a cryptographic key. In some examples, system 100 may compress the lookup table to reduce its size in memory.

In some examples, key generation logic 4 may select the portions of configuration data 12 that it uses to generate a cryptographic key based at least in part on mathematical relationships between the location of the selected portions of configuration data 12 in configuration storage 24. For example, the memory locations within configuration storage 24 of the portions of configuration data 12 used by key generation logic 4 to generate a cryptographic key may have a specified mathematical relationship. Such a mathematical relationship may be parameterized so that programmable logic device 2 may accept a variable or parameter to determine which portions of configuration data 12 are used by key generation logic 4 to generate the cryptographic key.

In some examples, key generation logic 4 may derive the cryptographic key based at least in part on a specific point of operations of a program on programmable logic 3. For example, configuration data 12 may be loaded into configuration storage 24 to program programmable logic 3 to perform a specific program. When the program being executed by programmable logic 3 reaches a specific point in the program, which may be a specific clock cycle timeline, a particular routine point, a specific function, and the like, key generation logic 4 may generate the cryptographic key based on one or more portions of configuration data 12 that is read out of configuration storage 24 at that particular point of the program, to result in a cryptographic key that is associated with the particular execution point of the program.

Key generation logic 4 may be configured to generate the cryptographic key based at least in part on at least a portion of configuration data 12 in a variety of ways. In particular, key generation logic 4 may generate the cryptographic key by combining one or more inputs 10 into key generation logic 4 with at least a portion of configuration data 12, such as via bitwise XOR of data received via one or more inputs 10 with the bitstream making up at least a portion of configuration data 12, hashing the data received via one or more inputs 10 with at least a portion of configuration data 12, and the like.

For example, key generation logic 4 may be configured to perform a cryptographic hash of at least a portion of configuration data 12. Performing a cryptographic hash of at least a portion of configuration data 12 may securely reduce at least a portion of configuration data 12 into a small digest so that even a small edit or change to the at least a portion of configuration data 12 may result in a large change in the resulting digest. Key generation logic 4 may combine the cryptographic hash of the at least a portion of configuration data 12 with data received via one or more inputs 10 to generate the cryptographic key.

In another example, key generation logic 4 may generate a hash key based at least in part on data received via one or more inputs 10 and may perform a cryptographic hash of at least a portion of configuration data 12 with the hash key, such as by performing a keyed-hash message authentication code (HMAC) hash of the at least a portion of configuration data 12 with the hash key to generate the cryptographic key. Generating the cryptography key by performing this hash may result in there not being enough data in the entirety of configuration data 12 alone to generate the cryptographic key. Thus, an attacker may be prevented from being able to reverse engineer the generated cryptographic key by reading configuration data 12.

The cryptographic key generated by key generation logic 4 is a key that is usable by cryptographic engine 6 to perform cryptographic operations. For example, cryptographic engine 6 may utilize the cryptographic key to decrypt a cipher text. In this example, if an attacker is able to gain access to the cryptographic key, then the attacker may be able to decrypt the cipher text.

A cipher text may be or include critical information that the hardware designer (e.g., author of configuration data 12) wishes to protect against hackers and other attackers by encrypting the critical information. The critical information could be instruction code, programmable logic configuration, or any other suitable data. The cipher text may be encrypted via any suitable encryption algorithm, so that the cipher text is able to be decrypted only via the cryptographic key generated by key generation logic 4 based at least in part on at least a portion of configuration data 12. Rather than include unencrypted critical information in configuration data 12, which may enable an attacker to intercept and access the critical information, the hardware designer may encrypt the critical information to generate the cipher text. In some examples, the cipher text may be included as part of configuration data 12 that is loaded into programmable logic device 2. In this example, the portion of configuration data 12 that contains the cipher text is not used by key generation logic 4 when generating cryptographic key 16.

In some examples, programmable logic device 2 may include internal configuration port 8. Internal configuration port 8 may be hardware, such as any suitable combination of circuitry, memory, or electrical components in programmable logic device 2 that is enables commands and data, such as configuration data 12, to be loaded into programmable logic device 2 to reconfigure programmable logic 3 and further enables configuration data 12 loaded into programmable logic device 2 to be read back.

Specifically, internal configuration port 8 may be operably coupled to programmable logic 3 so that internal configuration port 8 may, in response to receiving configuration data 12, may write configuration data 12 into memory in programmable logic 3. Furthermore, internal configuration port 8 may, in response to receiving a request to read configuration data 12, may read configuration data 12 from the configuration logic of programmable logic 3 and output configuration data 12.

Cryptographic engine 6 may be configured to utilize the cryptographic key generated by key generation logic 4 to decrypt a piece of cipher text into plaintext. In other words, cryptographic engine 6 may receive the cipher text and the cryptographic key as inputs, use the cryptographic key to decrypt the cipher text to plaintext, and output the plaintext that is the decrypted critical information.

Figure 2:
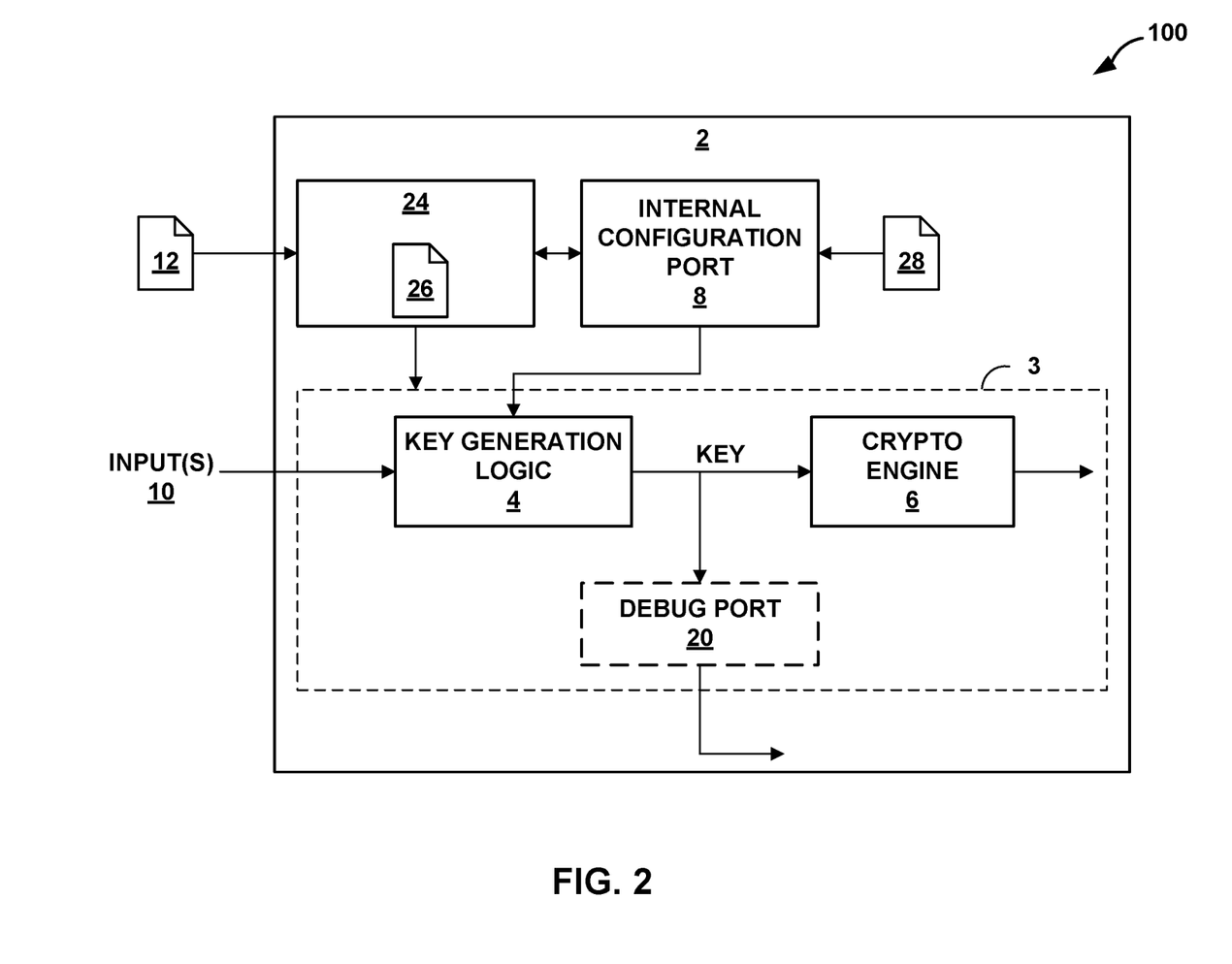
FIG. 2 is a functional block diagram illustrating the example system of FIG. 1 that includes programmable logic that an attacker may reconfigure in an attempt to read a cryptographic key generated by a key generation logic.

In some examples, an attacker may attempt to retrieve the cryptographic key generated by key generation logic 4 by reconfiguring programmable logic 3 to include a debug port that is able to read the output of key generation logic 4, so that the attacker may decrypt the cipher text using the intercepted cryptographic key. FIG. 2 is a functional block diagram illustrating the example system of FIG. 1 that includes programmable logic that an attacker may reconfigure in an attempt to read cryptographic key 16.

Similar to system 100 in FIG. 1, programmable logic device 2 may load configuration data 12 into configuration storage to configure programmable logic 3 to include key generation logic 4 and cryptographic engine 6. Key generation logic 4 may be configured to read configuration data 12 stored in configuration storage 24 via configuration port 8, and may generate the cryptographic key based at least in part on at least a portion of configuration data 12 read from configuration storage 24. Cryptographic engine 6 may be configured to use the cryptographic key to perform cryptographic operations, such as encrypting data, decrypting data, digitally signing data, and/or authenticating data.

A malicious actor may reconfigure programmable logic 3 to read the cryptographic key that is generated by key generation logic 4. For example, once programmable logic device 2 loads configuration data 12 into configuration storage 24 to configure programmable logic 3 to include key generation logic 4 and cryptographic engine 6, an attacker may reconfigure programmable logic 3 by loading, via internal configuration port 8, reconfiguration data 28 into configuration storage 24 to reconfigure programmable logic 3 to include debug port 20 that is configured to access the output of key generation logic 4. For example, reconfiguration data 28 may reconfigure regions of programmable logic 3 not used for key generation logic 4 and cryptographic engine 6 to insert debug port 20 by reconfiguring the logic elements and interconnect within the unused regions of programmable logic 3 to include debug port 20 that is configured to read the output of key generation logic 4.

To reconfigure programmable logic 3 with reconfiguration data 28, an attacker may access configuration storage 24 via internal configuration port 8 to load reconfiguration data 28 into configuration storage 24. Specifically, an attacker may load reconfiguration data 28 from memory via a bus into internal configuration port 8. In response to receiving reconfiguration data 28, internal configuration port 8 may load reconfiguration data 28 into configuration storage 24.

Programmable logic device 2 may write reconfiguration data 28 into portions (e.g., particular memory cells) of configuration storage 24 that is operably coupled to the particular logic elements of programmable logic 3 that reconfiguration data 28 configures to function as debug port 20. In this way, in the example of FIG. 2, configuration data 12 stored in configuration storage 24 is modified to include reconfiguration data 28, thereby resulting in modified configuration data 26 in configuration storage 24, so that modified configuration data 26 may configure programmable logic 3 to include key generation logic 4, cryptographic engine 6, and debug port 20.

A malicious attacker may configure debug port 20 by modified configuration data 26 to read the output of key generation logic 4 and to enable the output of key generation logic 4 to be read out of programmable logic device 2 via debug port 20. Because key generation logic 4 is configured to generate and output the cryptographic key that is used by cryptographic engine 6 to perform cryptographic operations, debug port 20 may be configured to read the cryptographic key from the output of key generation logic 4, thereby enabling an attacker to possibly be able to use the intercepted cryptographic key to decrypt cipher text using cryptographic engine 6.

In accordance with aspects of the present disclosure, programmable logic device 2 may prevent an attacker from successfully accessing the cryptographic key generated by key generation logic 4 by generating the cryptographic key based at least in part on reading at least a portion of configuration data 12 from configuration storage 24. Specifically, to generate a cryptographic key that may be used by cryptographic engine 6 to perform cryptographic operations, key generation logic 4 may read at least a portion of configuration data 12 from configuration storage 24, where configuration data 12 is the original configuration data loaded onto programmable logic device 2 to configure programmable logic 3 to include key generation logic 4 and cryptographic engine 6, and generates a cryptographic key based at least in part on the at least a portion of the configuration data 12.

If configuration data 12 in configuration storage 24 is modified via reconfiguration data 28 to result in modified configuration data 26 that configures programmable logic 3 to include debug port 20, then key generation logic 4 would read modified configuration data 26 from configuration storage 24 and generate a cryptographic key based at least in part on modified configuration data 26. However, because configuration data 12 is different from modified configuration data 26, the cryptographic key that key generation logic 4 generates based at least in part on modified configuration data 26 will be different from the cryptographic key that key generation logic 4 generates based at least in part on configuration data 12. Thus, if a piece of cipher text can only be decrypted using a cryptographic key generated based at least in part on configuration data 12, then that cipher text cannot be decrypted using a cryptographic key generated based at least in part on modified configuration data 26.

As can be seen, by configuring key generation logic 4 to generate a cryptographic key based at least in part on configuration data 12 stored in configuration storage 24, programmable logic device 2 may thwart an attacker's attempt to access the cryptographic key by reconfiguring programmable logic 3 to include debug port 20. By configuring programmable logic 3 to include key generation logic 4 that generates a cryptographic key based at least in part on the configuration data that configures programmable logic 3, any changes to the configuration of programmable logic 3 may cause key generation logic 4 to generate an invalid cryptographic key.

In some examples, instead of generating a cryptographic key, key generation logic 4 may read configuration data 12 from configuration storage 24 and may generate a checksum based at least in part on configuration data 12 read from configuration storage 24. Similar to generating a cryptographic key, if configuration data 12 is updated with reconfiguration data 28 to result in modified configuration data 26 stored in configuration storage 24, if key generation logic 4 generates a checksum based at least in part on modified configuration data 26 read from configuration storage 24, such a checksum would differ from the checksum generated by key generation logic 4 based at least in part on configuration data 12, which may indicate to programmable logic device 2 that it has been possibly tampered with by an attacker.

Figure 3:
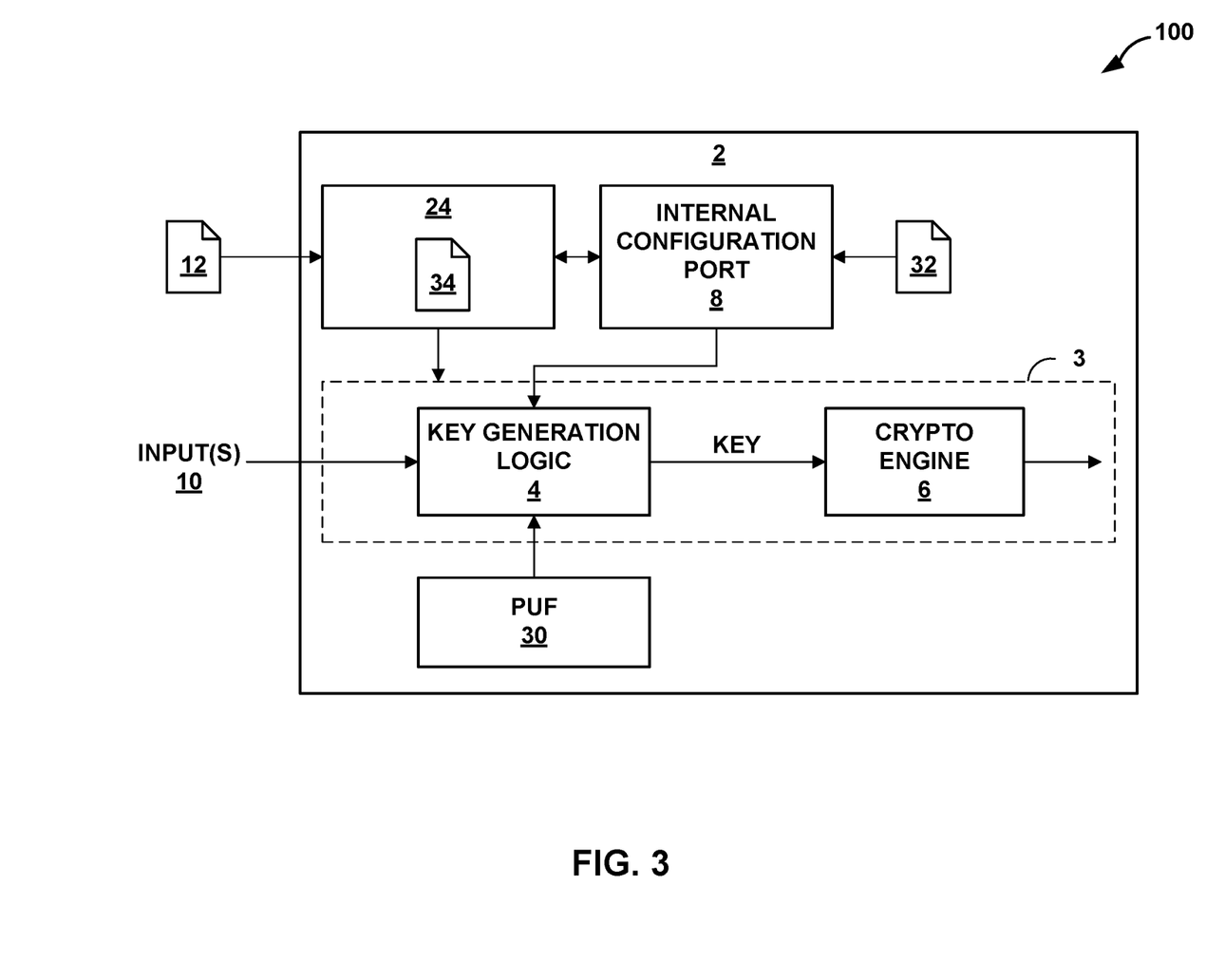
FIG. 3 is a functional block diagram illustrating an example system that includes an example programmable logic device that is configured to include key generation logic to generate a cryptographic key.

System 100 may further secure key generation logic 4 in other ways. FIG. 3 is a functional block diagram illustrating an example system that includes an example programmable logic device that is configured to include key generation logic to generate a cryptographic key. Similar to system 100 in FIGS. 1 and 2, programmable logic device 2 may load configuration data 12 into configuration storage 24 to configure programmable logic 3 to include key generation logic 4 and cryptographic engine 6. Key generation logic 4 may be configured to read configuration data 12 stored in configuration storage 24 via configuration port 8, and may generate a cryptographic key based at least in part on at least a portion of configuration data 12 read from configuration storage 24. Cryptographic engine 6 may be configured to use the cryptographic key generated by key generation logic 4 to perform cryptographic operations, such as encrypting plaintext into cipher text, decrypt cipher text into plaintext, digitally signing one or more files, authenticating one or more digitally signed files, and the like.

As shown in FIG. 3, system 100 may further secure key generation logic 4 via use of physically uncloneable function (PUF) device 30. System 100 may configure key generation logic 4 to generate a cryptographic key for based at least in part on the output generated by PUF device 30. In one example, key generation logic 4 may be configured by configuration data 12 to generate a cryptographic key for use by cryptographic engine 6 to perform cryptographic operations based at least in part on the output generated by PUF device 30 as well as at least a portion of configuration data 12 read back from configuration storage 24.

PUF device 30 may be an integrated circuit, electrical circuit, physical system, or any other suitable set of hardware devices that is attached to, embedded in, or otherwise operably coupled to programmable logic device 2, such that PUF device 30 may, in response to receiving a challenge value, perform a physically uncloneable function to output a response. The physically uncloneable function performed by PUF device 30 may be based at least in part on the physical device characteristics of PUF device 30 and/or programmable logic device 2, such that fluctuations and variations in the physical device characteristics of the components making up PUF device 30 and/or programmable logic device 2 may enable PUF device 30 to produce a unique, repeatable, and unpredictable response to the challenge value.

Because the output of PUF device 30 depends on the physical characteristics of PUF device 30, the output of PUF device 30 cannot be determined by analyzing configuration data 12 that configures programmable logic 3 to include key generation logic 4. Thus, generating the cryptographic key based at least in part on the output of PUF device 30 may thwart unauthorized attempts to determine the inputs and inner workings of key generation logic 4 even if detailed configuration memory models of programmable logic 3 are used for offline simulations of key generation logic 4.

Alternatively, or in addition to using PUF device 30, key generation logic 4 may also be configured to generate a cryptographic key based at least in part on modified configuration data that key generation logic 4 reads from configuration storage 24. Specifically, configuration data 12 may initially be loaded into configuration storage 24 to configure programmable logic 3 to include key generation logic 4 and cryptographic engine 6. Subsequently, system 100 may load reconfiguration data 32 via internal configuration port 8 into configuration storage 24, thereby updating configuration data 12 with reconfiguration data 32 to result in updated configuration data 34 stored in configuration storage 24.

Key generation logic 4 may be configured by configuration data 12 to generate a cryptographic key based at least in part on reconfiguration data 32. Because configuration data 12 is updated with reconfiguration data 32 to result in updated configuration data 34, key generation logic 4 is also configured by configuration data 12 to generate a cryptographic key based at least in part on updated configuration data 34. Further, because updated configuration data 34 includes at least some portions of both configuration data 12 and reconfiguration data 32, the cryptographic key generated by key generation logic 4 may be dependent upon both configuration data 12 and reconfiguration data 32. If reconfiguration data 32 is encrypted, generating a cryptographic key that is dependent upon both configuration data 12 and reconfiguration data 32 may provide an extra layer of protection to key generation logic 4 because an attacker would need to find a way to decrypt reconfiguration data 32 in order to try and intercept or otherwise access the cryptographic key generated by key generation logic 4.

Although configuration data 12 has been described with respect to FIGS. 1-3 as configuring programmable logic 3 to include key generation logic 4 and cryptographic engine 6, it should be understood that, in some examples, configuration data may configure programmable logic 3 to include key generation logic 4 but not cryptographic engine 6, to include cryptographic engine 6 but not key generation logic 4, or to not include either key generation logic 4 or cryptographic engine 6.

Figure 4:
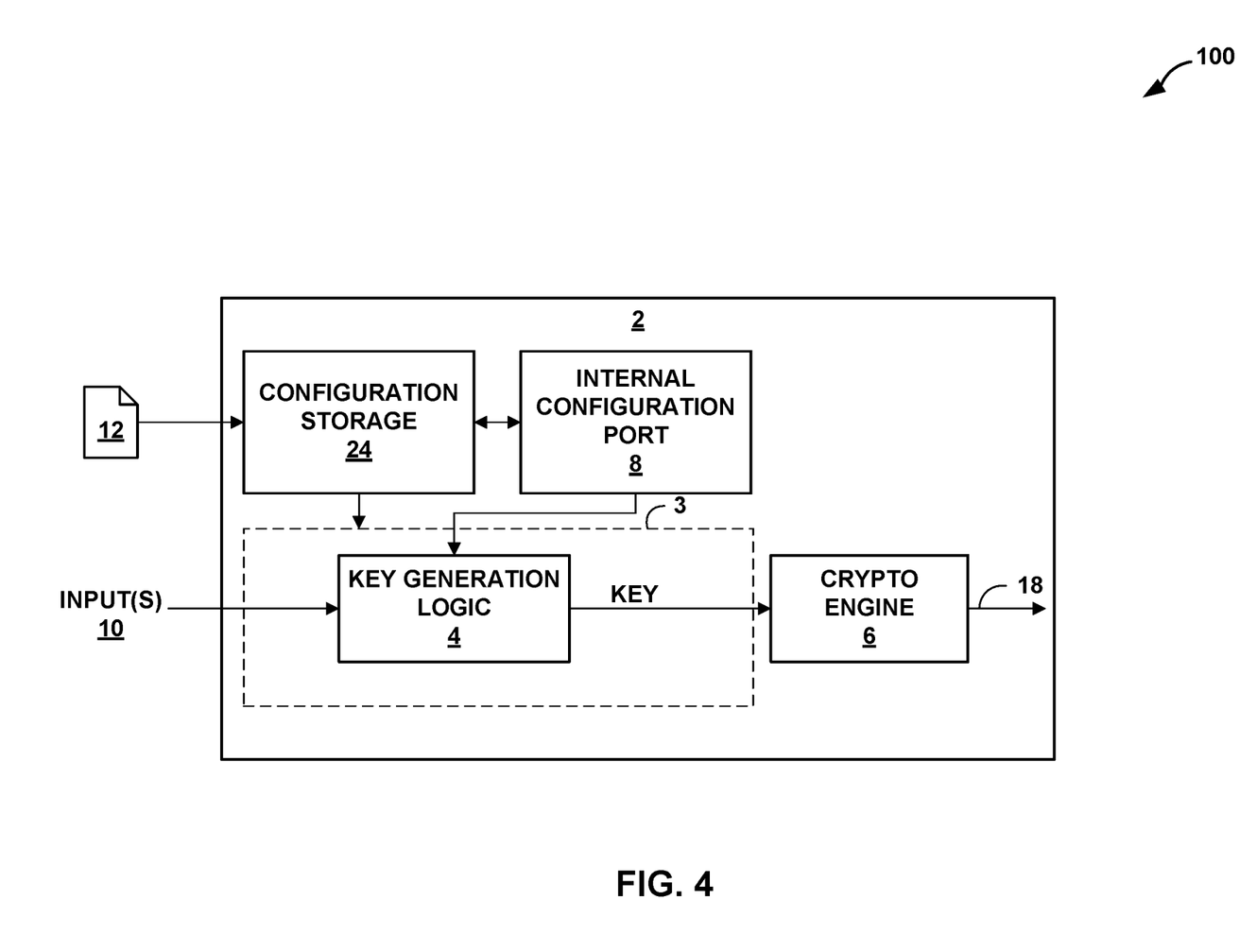
FIG. 4 is functional block diagram illustrating an example system that includes an example programmable logic device that is configured to include key generation logic to generate a cryptographic key but not a cryptographic engine.

FIG. 4 is functional block diagram illustrating an example system that includes an example programmable logic device that is configured to include key generation logic to generate a cryptographic key but not a cryptographic engine. As shown in FIG. 4, configuration data 12 may configure programmable logic 3 to include key generation logic 4. Configuration data 12, however, does not configure programmable logic 3 to include cryptographic engine 6. Instead, cryptographic engine 6 may be a hardware unit or circuitry in programmable logic device 2 outside of programmable logic 3 that may be configured to receive the cryptographic key generated by configuration data 12 and to perform cryptographic operations based at least in part on the cryptographic key.

It should be understood that key generation logic 4 may perform all of the above-described techniques discussed with respect to FIGS. 1-3 to generate a cryptographic key based at least in part on at least a portion of configuration data 12 for use by cryptographic engine 6. Because configuration data 12 does not configure programmable logic 3 to include cryptographic engine 6, it is possible that key generation logic 4 may generate a cryptographic key that is different than a cryptographic key generated based at least in part on configuration data 12 that does configure programmable logic 3 to include cryptographic engine 6. Further, cryptographic engine 6 may perform all of the above-described techniques discussed with respect to FIGS. 1-3 to perform cryptographic operations using the cryptographic key generated by key generation logic 4.

Figure 5:
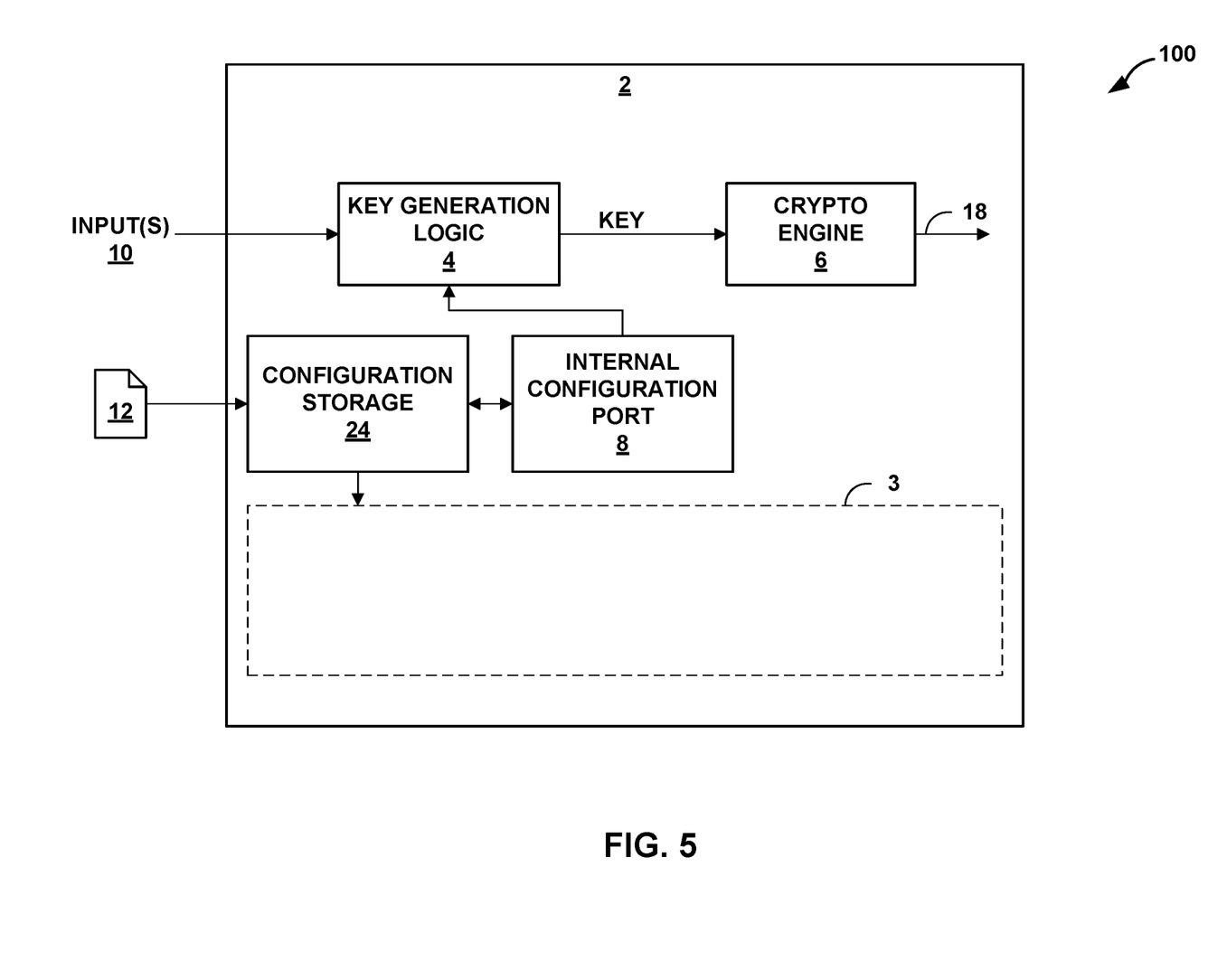
FIG. 5 is functional block diagram illustrating an example system that includes an example programmable logic device that is configured to not include either key generation logic to generate a cryptographic key or a cryptographic engine.

In some examples, configuration data 12 may configure programmable logic 3 to not include either key generation logic 4 or cryptographic engine 6. FIG. 5 is functional block diagram illustrating an example system that includes an example programmable logic device that is configured to not include either key generation logic to generate a cryptographic key or a cryptographic engine. As shown in FIG. 5, configuration data 12 does not configure programmable logic 3 to include key generation logic 4 or cryptographic engine 6. Instead, key generation logic 4 and cryptographic engine 6 may be hardware units or circuitry included in programmable logic device 2 that performs the functions of key generation logic 4 and cryptographic engine 6, respectively, as described throughout this disclosure with respect to FIGS. 1-3.

In some examples, programmable logic device 2 may not include one or both of key generation logic 4 and cryptographic engine 6. Instead, one or both of key generation logic 4 and cryptographic engine 6 may be hardware units that are not included by programmable logic device 2. Nonetheless, whether key generation logic 4 and cryptographic engine 6 are included in programmable logic device 2 or are otherwise hardware circuitry not included in programmable logic device 2, key generation logic 4 may be configured to generate a cryptographic key based at least in part on at least a portion of configuration data 12, and cryptographic engine 6 may be configured to utilize the cryptographic key generated by key generation logic 4 to perform cryptographic operations.

Figure 6:
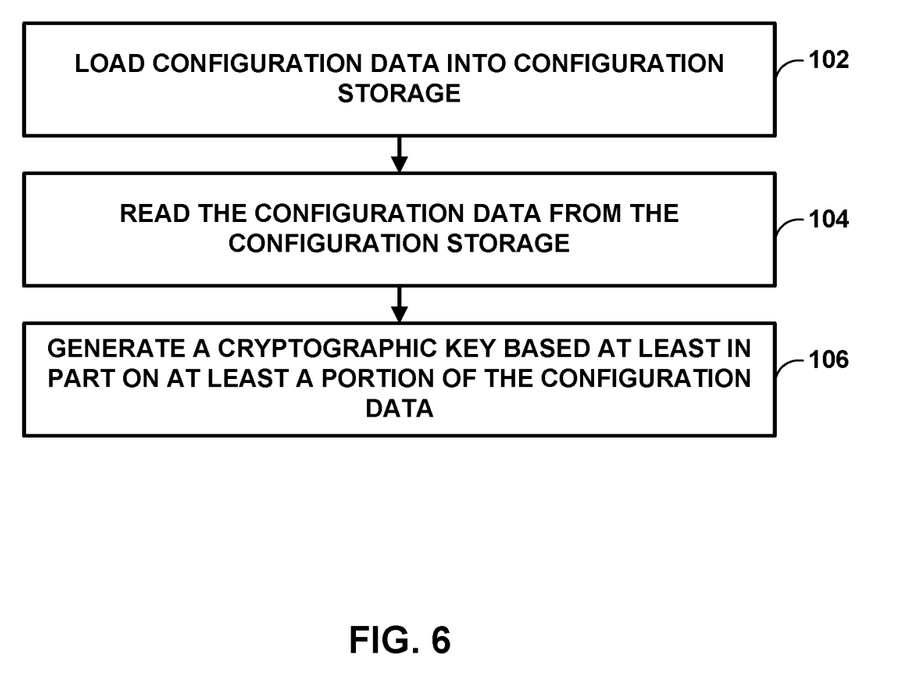
FIG. 6 is a flow diagram of an example technique for generating a cryptographic key in a programmable device.

FIG. 6 is a flow diagram of an example technique for generating a cryptographic key in a programmable device. The technique shown in FIG. 6 may be implemented by system 100 of FIGS. 1-5. In the technique shown in FIG. 6, programmable logic device 2 may load configuration data 12 into a configuration storage 24 to configure programmable logic 3 of the programmable logic device 2 (102). The key generation logic 4 may read at least a portion of the configuration data 12 from the configuration storage 24 (104). The key generation logic 4 may generate a cryptographic key based at least in part on the at least a portion of the configuration data 12 read from the configuration storage 24 (106). In some examples, configuring the programmable logic 3 may further include configuring the programmable logic 3 to comprise the key generation logic 4. In some examples, the key generation logic 4 may further be configured to determine one or more locations of the configuration storage 24 from which to read one or more portions of the configuration data 12, and to generate the cryptographic key based at least in part on the one or more portions of the configuration data 12. In some examples, memory in system 100 may be configured to store a lookup table that includes indications of the one or more locations of the configuration storage 24 from which to read one or more portions of the configuration data 12.

In some examples, key generation logic 4 reading at least a portion of the configuration data 12 from the configuration storage 24 may further include the key generation logic 4 reading at least a portion of the configuration data 12 from the configuration storage 24 via an internal configuration port 8 of the programmable device. In some examples, key generation logic 4 generating the cryptographic key may include key generation logic 4 generating the cryptographic key based at least in part on performing a cryptographic hash of at least a portion of the configuration data 12 with one or more inputs of the key generation logic 4.

In some examples, in the techniques shown in FIG. 4, the configuration storage 24 may further update the configuration data 12 in the configuration storage 24 based at least in part on partial reconfiguration data 32. The key generation logic 4 may generate the cryptographic key based at least in part on the updated configuration data 34.

In some examples, key generation logic 4 may generate the cryptographic key further based at least in part on an output of a PUF device 30. In some examples, the programmable logic device 2 may comprise a field programmable gate array (FPGA) device.

In some examples, a cryptographic engine 6 may be configured to utilize at least the cryptographic key generated by key generation logic 4 to perform a cryptographic operation. In some examples, the cryptographic engine 6 may be configured to utilize at least the cryptographic key as a decryption key to decrypt a cipher text into plaintext. In some examples, the cryptographic engine 6 may be configured to utilize at least the cryptographic key as an encryption key to encrypt plaintext into cipher text. In some examples, the cryptographic engine 6 may utilize the cryptographic key as an encryption key to encrypt plaintext into cipher text. In some examples, the cryptographic engine 6 may be configured to utilize at least the cryptographic key as a decryption key to decrypt a cipher text into plaintext. In some examples, the cryptographic engine may be configured to utilize the cryptographic key to digitally sign a file. In some examples, the cryptographic engine may be configured to utilize the cryptographic key to authenticate a digitally signed file.

The techniques of this disclosure may be implemented in a wide variety of computer devices. Any components, modules or units have been described provided to emphasize functional aspects and does not necessarily require realization by different hardware units. The techniques described herein may also be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset.

If implemented in software, the techniques may be realized at least in part by a computer-readable medium comprising instructions that, when executed in a processor, performs one or more of the methods described above. The computer-readable medium may comprise a tangible computer-readable storage medium and may form part of a larger product. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The computer-readable storage medium may also comprise a non-volatile storage device, such as a hard-disk, magnetic tape, a compact disk (CD), digital versatile disk (DVD), Blu-ray disk, holographic data storage media, or other non-volatile storage device.

The memory described herein that defines the physical memory addresses, which may be used as part of the described PUF, may also be realized in any of a wide variety of memory, including but not limited to, RAM, SDRAM, NVRAM, EEPROM, FLASH memory, dynamic RAM (DRAM), magnetic RAM (MRAM), or other types of memory.

The term "processor," as used herein may refer to any of the foregoing structure or any other structure suitable for implementation of the techniques described herein. In addition, in some aspects, the functionality described herein may be provided within dedicated software modules or hardware modules configured for performing the techniques of this disclosure. Even if implemented in software, the techniques may use hardware such as a processor to execute the software, and a memory to store the software. In any such cases, the computers described herein may define a specific machine that is capable of executing the specific functions described herein. Also, the techniques could be fully implemented in one or more circuits or logic elements, which could also be considered a processor.

Various examples of the invention have been described. These and other examples are within the scope of the following claims.

What is claimed is:

1. A system comprising:
   configuration storage configured to store configuration data for a programmable logic device, wherein the configuration data comprises a collection of computer instructions that specifies the functionality to be performed by programmable logic;
   the programmable logic in the programmable logic device operably coupled to the configuration storage, wherein the programmable logic is configured by the configuration data in the configuration storage;
   a key generation logic configured to read at least a portion of the configuration data from the configuration storage and to generate a cryptographic key based on combining at least a portion of the configuration data read from the configuration storage with one or more inputs to the key generation logic;
   an internal configuration port configured to enable access to the configuration storage, wherein the key generation logic is configured to read the at least a portion of the configuration data from the configuration storage via the internal configuration port; and
   a cryptographic engine configured to utilize at least the cryptographic key to perform a cryptographic operation,
   wherein the configuration storage is further configured to receive updated configuration data based at least in part on reconfiguration data; and
   wherein in response to a reconfiguration, the key generation logic is configured to read the updated configuration data and to generate the cryptographic key by combining at least a portion of the updated configuration data from the configuration storage with the one or more inputs to the key generation logic.

2. The system of claim 1, wherein the programmable logic in the programmable logic device is further configured by the configuration data to comprise the key generation logic.

3. The system of claim 1, wherein the key generation logic is further configured to determine one or more locations of the configuration storage from which to read one or more portions of the configuration data, and to generate the cryptographic key by combining the one or more portions of the configuration data with the one or more inputs to the key generation logic.

4. The system of claim 3, further comprising:
   memory configured to store a lookup table that includes indications of the one or more locations of the configuration storage.

5. The system of claim 1, wherein the key generation logic is further configured to generate the cryptographic key based at least in part on performing a cryptographic hash of the at least a portion of the configuration data with the one or more inputs of the key generation logic.

6. The system of claim 1, further comprising a physically unclonable function (PUF) device, wherein the key generation logic is configured to generate the cryptographic key based at least in part on an output of the PUF device.

7. The system of claim 1, wherein:
the programmable logic device of the system comprises a field programmable gate array (FPGA) device.

8. The system of claim 1, wherein the configuration storage comprises an on-chip memory in an integrated circuit that includes programmable logic device.

9. The system of claim 1, wherein the cryptographic engine is further configured to utilize at least the cryptographic key as a decryption key to decrypt a cipher text into plaintext.

10. The system of claim 1, wherein the cryptographic engine is further configured to utilize at least the cryptographic key as an encryption key to encrypt plaintext into cipher text.

11. The system of claim 1, wherein the cryptographic engine is further configured to utilize the cryptographic key to digitally sign a file.

12. The system of claim 1, wherein the cryptographic engine is further configured to utilize at least the cryptographic key to authenticate a digitally signed file.

13. The system of claim 1, wherein the programmable logic is further configured by the configuration data to comprise the cryptographic engine.

14. A method comprising:
loading, by a programmable device, configuration data for configuring programmable logic of the programmable device into a configuration storage, wherein the configuration data comprises a collection of computer instructions that specifies the functionality to be performed by the programmable logic;
reading, by a key generation logic, at least a portion of the configuration data from the configuration storage, via an internal configuration port of the programmable device;
generating, by the key generation logic, a cryptographic key, wherein the cryptographic key is generated based on combining at least a portion of the configuration data read from the configuration storage with one or more inputs to the key generation logic; and
in response to receiving updated configuration data based at least in part on reconfiguration data:
reading, by the key generation logic, the updated configuration data; and
generating, by the key generation logic, an updated cryptographic key by combining at least a portion of the updated configuration data from the configuration storage with the one or more inputs to the key generation logic.

15. The method of claim 14, wherein loading the configuration data into the configuration storage further comprises:
loading, by the programmable device, the configuration data into the configuration storage to configure the programmable logic of the programmable device to include the key generation logic.

16. A non-transitory computer-readable storage medium comprising instructions that upon execution cause a processor to:
load configuration data into configuration storage of a programmable device to configure programmable logic of the programmable device, wherein the configuration data comprises a collection of computer instructions that specifies the functionality to be performed by the programmable logic;
read, by a key generation logic, at least a portion of the configuration data from the configuration storage; and
generate a cryptographic key, wherein the cryptographic key is generated based on combining the at least a portion of the configuration data read from the configuration storage with one or more inputs to the key generation logic; and
in response to receiving updated configuration data based at least in part on reconfiguration data cause the processor to:
read the updated configuration data; and
generate an updated cryptographic key by combining at least a portion of the updated configuration data from the configuration storage with the one or more inputs to the key generation logic.

17. The non-transitory computer-readable storage medium of claim 16, wherein the instructions further cause the processor to:
load the configuration data into the configuration storage of the programmable device to configure the programmable logic of the programmable device to comprise the key generation logic.

* * * * *